United States Patent
Nishizawa et al.

[19]

[11] Patent Number: 5,845,494
[45] Date of Patent: Dec. 8, 1998

[54] LIFT CONTROL METHOD

[75] Inventors: Kazumi Nishizawa; Yutaka Izumida, both of Tokyo; Hitoshi Fujisawa, Kanagawa, all of Japan

[73] Assignees: Pabco Co., Ltd, Kanagawa; Nikko Electric Industry Co., Ltd., Tokyo, both of Japan

[21] Appl. No.: 828,577

[22] Filed: Mar. 31, 1997

[30] Foreign Application Priority Data

Sep. 25, 1996 [JP] Japan ................................. 8-272915

[51] Int. Cl.⁶ .................................................. F16D 31/02
[52] U.S. Cl. .............................. 60/403; 60/426; 91/517
[58] Field of Search .......................... 60/399, 403, 420, 60/426; 91/517, 518

[56] References Cited

U.S. PATENT DOCUMENTS

| | | | |
|---|---|---|---|
| 4,505,111 | 3/1985 | Okamoto et al. | 60/431 |
| 4,665,696 | 5/1987 | Rosman | 60/417 X |
| 5,297,381 | 3/1994 | Eich et al. | 91/518 X |
| 5,301,505 | 4/1994 | Wright | 91/518 X |
| 5,305,680 | 4/1994 | Weber | 91/517 X |

FOREIGN PATENT DOCUMENTS

| | | |
|---|---|---|
| 3630850 | 9/1986 | Germany. |
| 4430437 | 8/1994 | Germany. |
| 91/10577 | 1/1991 | WIPO. |

*Primary Examiner*—Hoang Nguyen
*Attorney, Agent, or Firm*—Majestic, Parsons, Siebert & Hsue P.C.

[57] ABSTRACT

A lift having a freight-receiving table which is rotatably supported by one or more each of hydraulic lift and tilt cylinders for respectively lifting and tilting the table is controlled such that an overloaded condition of the table is detected by measuring the internal pressure of the tilt cylinder or both the tilt and lift cylinders. If the measured pressure exceeds a pre-determined critical value, the operation of the lift is automatically and immediately stopped.

2 Claims, 5 Drawing Sheets

LIFT CONTROL METHOD

BACKGROUND OF THE INVENTION

This invention relates to the control of a lift of the kind attached to a back part of a freight truck for transporting freight up into and down from the truck. More particularly, the invention relates to a method for automatically preventing such a lift from being overloaded.

FIGS. 4A and 4B show a lift of this type, attached to a back part of a freight truck. Such a lift generally makes use of a parallel link mechanism comprising a plurality of cylinders to open and close a freight-receiving table (or a tail gate) by tilting it and to move it up and down as a whole.

Explained more in detail with reference to FIG. 5, a gate-tilting mechanism 30 of such a lift may comprise a tail gate 31, a tilt cylinder 32 with a piston, a main arm 36 and an attachment bracket 38. The tip of the piston of the tilt cylinder 32 is axially connected to the tail gate 31 through a pin 34, and the other end of the tilt cylinder 32 is axially connected to the bracket 38 through another pin 39. Similarly, one end of the main arm 36 is axially connected to the tail gate 31 through a pin 33, and the other end is axially connected to the bracket 38 through another pin 35. The attachment bracket 38 is welded to the chassis 37 of the truck.

The tail gate 31 is shown with solid lines when it is at a lowered position touching the ground but is kept in a horizontal (tilted-up) orientation by the gate-tilting mechanism 30. The tail gate 31 can be stopped also in the air above the ground, depending on the height of the platform, to or from which freight is to be transported. As soon as the tail gate 31 is stopped, either on and in contact with the ground or in the air without touching the ground, the hydraulic pressure inside the tilt cylinder is reduced such that the tail gate 31 rotates smoothly around the pin 33 to assume the lowered (tilted-down) orientation shown by dotted lines in FIG. 5. This is so as to make easier the loading and unloading over the tail gate 31. After the freight to be transported is placed on the tail gate 31, a hydraulic liquid (or oil) is introduced into the tilt cylinder 32 to push its piston outward such that the tail gate 31 rotates around the pin 33 until it reaches its horizontal (tilted-up) orientation shown by the solid lines in FIG. 5. Thereafter, while the tilt cylinder 32 is operated such that the tail gate 31 will stay in this horizontal orientation, a lift cylinder (not shown in FIG. 5) is activated to move the tail gate 31 as a whole.

The tilting motion of a tail gate, as described above, is generally effected by means of a pair of left-hand and right-hand tilt cylinders, of which the motion is controlled by a power unit comprising hydraulic pumps, electric motors for operating these pumps and solenoid valves, as well as an electric control unit.

Prior art lifts are usually not provided with any means for warning the user that the load exceeds a specified maximum allowable level. Such lifts are dangerous when they are used to load an empty truck because the truck may lose its balance and drop its loaded cargo. Even if a warning device is provided, the warning sometimes comes too late and the freight may have been raised quite high before the user realizes the dangerous condition and stops the loading operation. This is particularly dangerous when the work is taking place on a slope.

Another disadvantage of prior art load-sensing devices was that the measured load value depends on the position of the freight on the tail gate. This makes accurate measurement very difficult. Still another disadvantage of prior art devices for preventing overloading was that they were bulky, heavy and costly.

SUMMARY OF THE INVENTION

It is therefore an object of this invention to provide means for and a method of controlling a lift such that an overloaded condition can be automatically detected and the overall operation of the lift can then be stopped.

It is another object of this invention to provide such a method of controlling a lift by detecting an overloaded condition before the lifting of the loaded freight is started.

It is a further object of this invention to provide such a method of detecting an overloaded condition independent of the position of the load on the tail gate.

A control system for a lift may be characterized as comprising a power unit including a hydraulic pump, an electric motor for operating the hydraulic pump, and valves for selectably allowing or not allowing a hydraulic liquid from the hydraulic pump to be transported into the hydraulic lift and tilt cylinders respectively for lifting and tilting the tail gate, a pressure sensor for measuring the pressure inside at least one of the hydraulic cylinders caused by a load on the tail gate, at least one external switch, and a controller serving to transmit output signals to the motor and to the valves in response to input signals from the pressure sensor and the external switches. The controller also serves to automatically and immediately stop the overall operation of the lift if the load on the tail gate as detected by the pressure sensor exceeds a specified critical level.

The valves in such a control system may include a main valve between the hydraulic pump and each of the two hydraulic cylinders, a tilt valve between the main valve and the hydraulic tilt cylinder, and a lift valve between the main valve and the hydraulic lift cylinder. The controller may include an interface for responding to an analog signal from the pressure sensor and a semiconductor switch which operates according to a signal outputted from the interface indicative of the level of the analog signal.

A control method embodying this invention may be characterized as comprising the steps of tilting the tail gate after it is loaded with freight, measuring pressure inside the tilt cylinder or both inside the tilt and lift cylinders and comparing the measured pressure with a specified critical level, stopping the overall operation of the lift if the measured pressure exceeds a pre-determined critical level, and determining whether an overloaded condition exists through the measured pressure before the freight-receiving table is moved up or down as a whole.

BRIEF DESCRIPTION OF THE DRAWINGS

The accompanying drawings, which are incorporated in and form a part of this specification, illustrate an embodiment of the invention and, together with the description, serve to explain the principles of the invention. In the drawings.

DETAILED DESCRIPTION OF THE INVENTION

Figure 1:
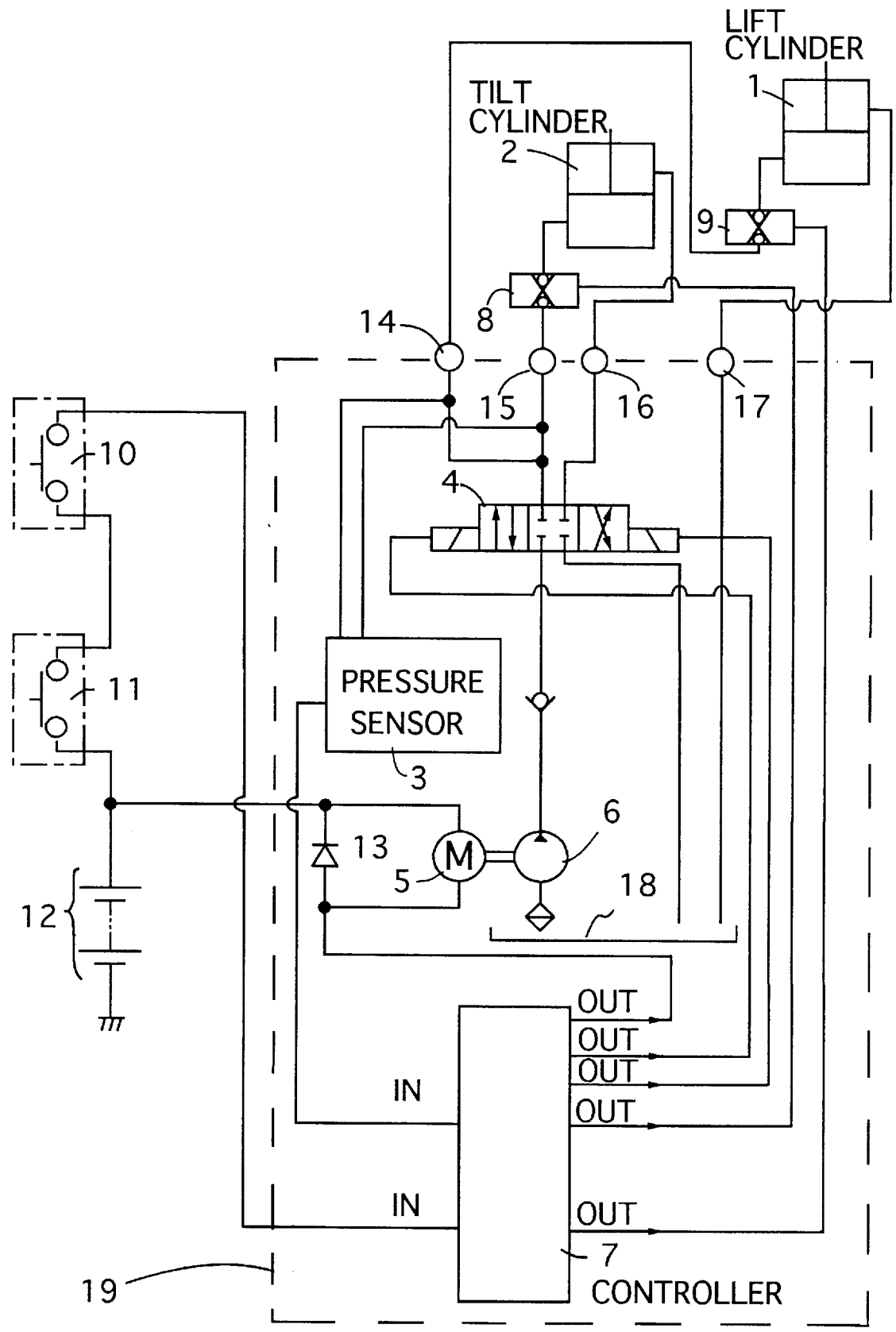
FIG. 1 is a system circuit diagram of a control unit for controlling the operation of a freight lift by a method of this invention.

FIG. 1 is a system circuit diagram of a control unit for controlling the lifting and tilting operations of a lift having a tail gate which is supported by at least one hydraulic cylinder for moving it up and down as a whole (referred to as the lift cylinder 1) and at least another hydraulic cylinder (referred to as the tilt cylinder 2) for tilting it up and down and thereby opening and closing it. The system further includes a hydraulic pump 6, an electric motor 5, a pressure sensor 3, a controller 7, a main valve 4, a tilt valve 8, a lift valve 9, external switches 10 and 11, a power source 12, a flywheel diode 13, ports 14, 15, 16 and 17, and an oil tank 18. The hydraulic pump 6, the motor 5, the main valve 4, the pressure sensor 3 and the controller 7 may be considered to together form a power unit 19 serving as the power source for the lift cylinder 1 and the tilt cylinder 2, respectively for the lifting and tilting motions of the lift. Both the lift cylinder 1 and the tilt cylinder 2 are a hydraulic cylinder, each serving to cause its piston to undergo a reciprocating motion by means of a hydraulic operating liquid (referred to as "the oil") supplied through the hydraulic pump 6. The main valve 4, the tilt valve 8 and the lift valve 9 are each a solenoid valve, controlled by signals outputted from the controller 7. One end of the tilt valve 8 is connected to one of the oil chambers of the tilt cylinder 2, and its other end is connected to the main valve 4. One end of the lift valve 9 is connected to one of the oil chambers of the lift cylinder 1, and its other end is connected to the main valve 4. The pressure sensor 3 comprises a piezoelectric element adapted to convert pressure into an electrical signal, being an analog element outputting signals at different levels, depending on the magnitude of pressure. One end of the pressure sensor 3 is near the tilt valve 8, and its other end is connected to an input port of the controller 7. Another accessory pressure sensor (not shown as a separate sensor in FIG. 1) may be used auxiliarily for detecting the pressure inside the lift cylinder 1. The external switches 10 and 11 are connected in series such that the operation of the system as a whole will stop if either of them is switched off. They may be ordinary button switches, one of them set to be operated from the driver's seat and the other set at a back part of the truck. The number of the external switches is not intended to limit the scope of the invention. There may be only one external switch, and there may be three or more connected in series.

The controller 7 has many functions, as will be described in detail below, and is adapted to transmit control signals to the motor 5, the main valve 4, the tilt valve 8 and the lift valve 9 in response to signals received from the pressure sensor 3 and the external switches 10 and 11. The flywheel diode 13 is for the purpose of absorbing the surge voltage immediately after the motor 5 is switched off. The motor 5 and the hydraulic pump 6 are connected by means of a coupler.

Figure 2:
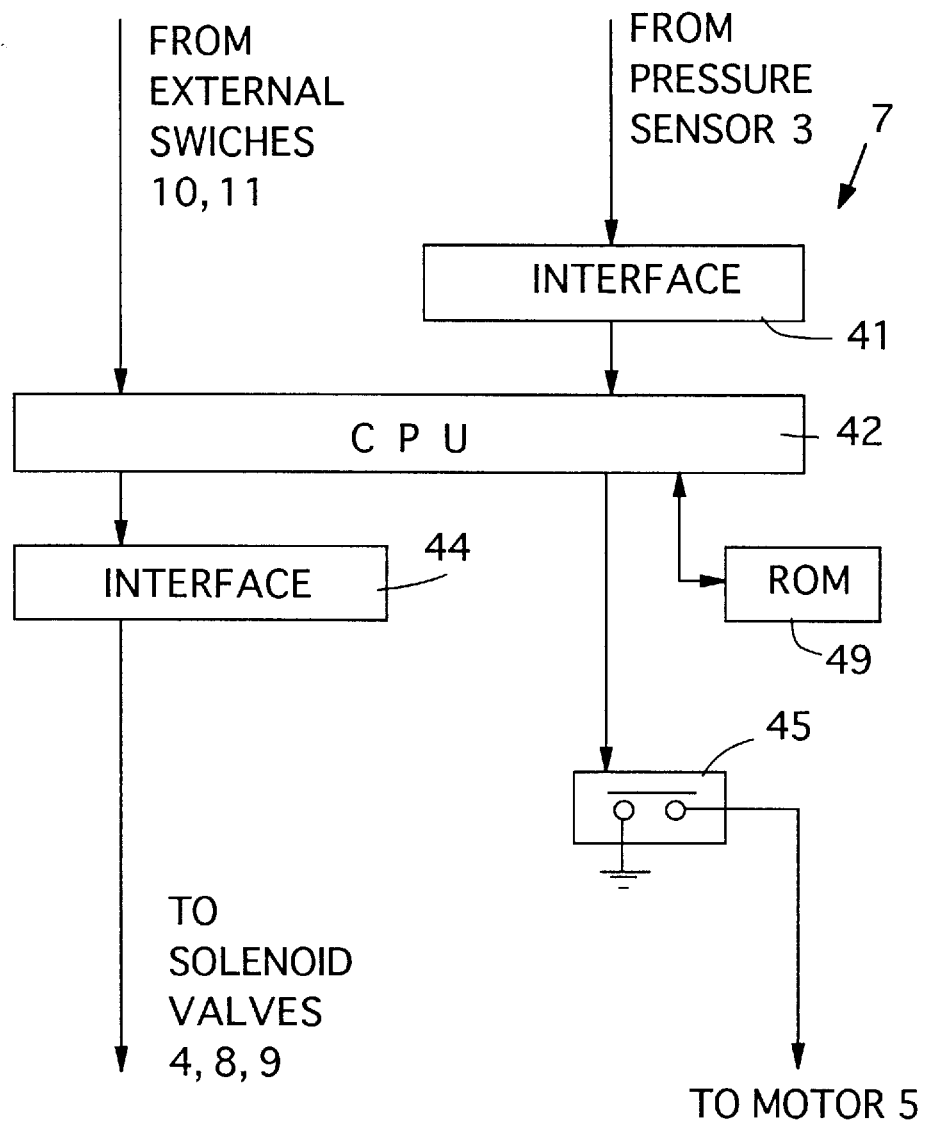
FIG. 2 is a block diagram of the controller of FIG. 1.

As shown in FIG. 2, the controller 7 comprises a central processing unit (CPU) 42, a semiconductor switch 45, a memory (ROM) 49 and interfaces 41 and 44. Analog signals from the pressure sensor 3 are converted by the interface 41 into digital signals before they are inputted to the CPU 42. ON/OFF signals from the external switches 10 and 11 are also received by the CPU 42. The CPU 42 responds to the signals from the pressure sensor 3 according to a program preliminarily stored in the memory (ROM) 49 by outputting signals for controlling the motor 5 and the solenoid valves 4, 8 and 9. Signals for controlling the motor 5 are passed through the semiconductor switch 45 to the motor 5. Signals for controlling the solenoid valves 4, 8 and 9 are transmitted through the interface 44.

The operations of the control unit of FIG. 1 for controlling the tilt motion of the lift will be described next. Let us assume for this purpose that the tail gate 31 is initially kept in the horizontal (tilted-up) orientation, whether the tail gate 31 as a whole is resting on the ground as shown by solid lines in FIG. 5 or is stopped in the air above the ground for loading or unloading. The tilt valve 8 is then opened to push out the hydraulic operating liquid (or "the oil") from one of its chambers through the port 15, returning it through the main valve 4 back to the oil tank 18. This causes the tail gate 31 to tilt slowly downward until it comes to a stop.

Figure 5:
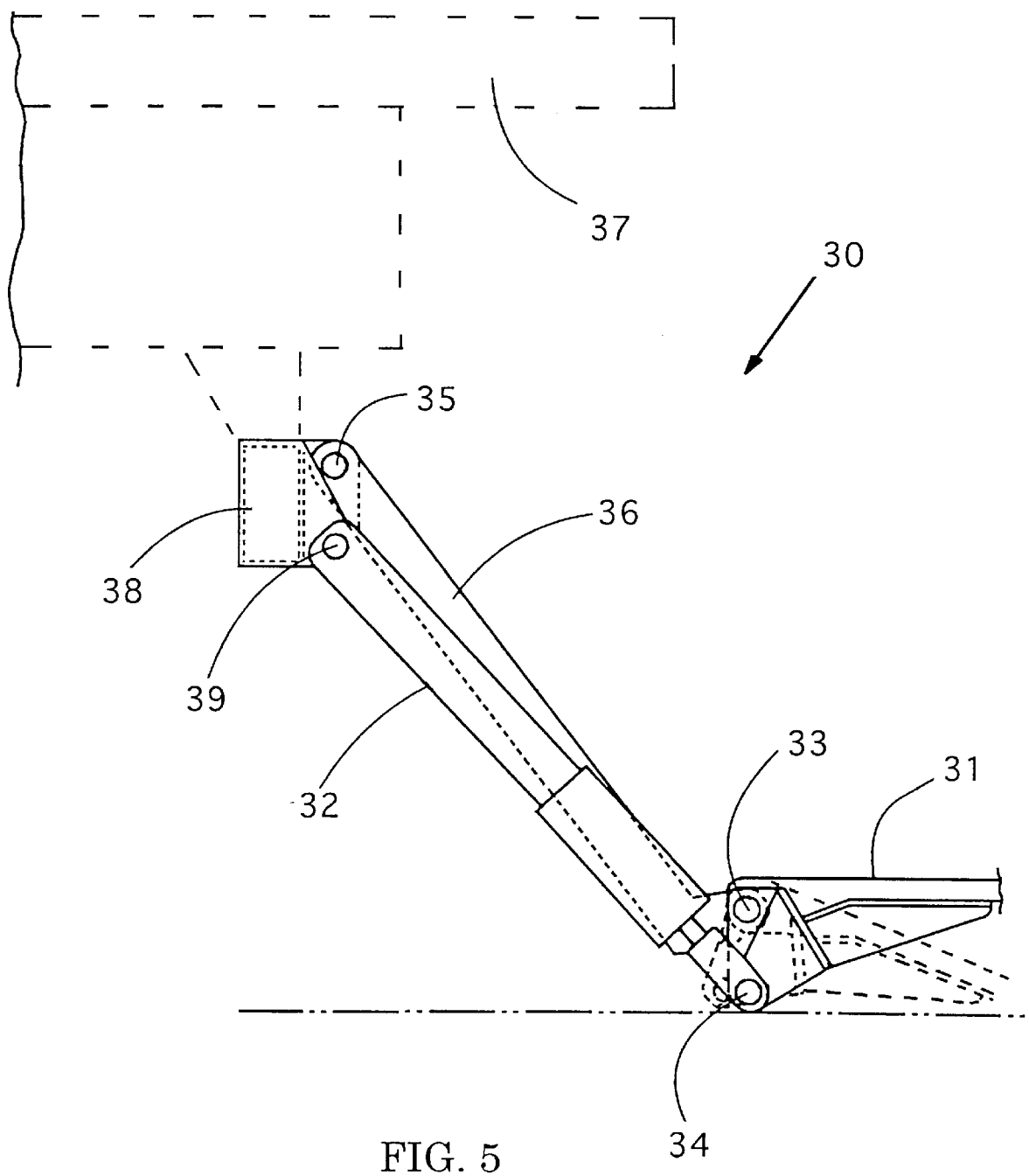
FIG. 5 is a side view of the mechanism for tilting the tail gate of the freight lift of the kind shown in FIG. 4.

Let us assume, without loss of generality, that the tail gate 31 was initially resting on the ground and that the tail gate 31 is now in the tilted-down orientation shown by the dotted lines in FIG. 5. Let us further assume that freight to be loaded has been placed on the tail gate 31 and that it is now ready to be raised. The external switches 10 and 11 are then both switched on, and the motor 5 activates the hydraulic pump 6 to cause the oil in the oil tank 18 to pass through the main valve 4 and the port 15 to enter the tilt cylinder 2, pushing out its piston. At the same time, the oil in the other chamber (above the piston as shown in FIG. 1) of the tilt cylinder 2 is pushed out, passes through the port 16 and the main valve 4 and returns to the oil tank 18. As the tail gate 31 thereby begins to tilt upward from the tilted-down position shown by dotted lines in FIG. 5, the pressure inside the tilt cylinder 2 and that inside the lift cylinder 1 are measured by the pressure sensor 3 and the auxiliary sensor (not shown), if there is one. The measured pressure values are transmitted to the controller 7 where they are compared with a pre-determined critical value. This critical value is pre-determined such that, if the load on the tail gate 31 is greater than its maximum permissible value, the measured pressure value will reach this critical value, and the motor 5 is stopped, allowing the tail gate 31 to return to and remain in the tilted-down position shown by dotted lines in FIG. 5.

If the load on the tail gate 31 does not exceed the critical value and the tail gate 31 is tilted up to its horizontal orientation as shown by solid lines in FIG. 5, it is ready to be lifted. The lifting motion of the lift is effected similarly to the tilting motion described above, except that the oil from the oil tank 18 is driven by the hydraulic pump 6 through the main valve 4, the port 14 and the lift valve 9 into the lift cylinder 1. Although not shown graphically, the piston of the lift cylinder 1 is connected to a mechanism for causing the lift to undergo its lifting motion such that, as the piston of the lift cylinder 1 is thus pushed outward, the lift is moved such that the freight on the tail gate 31 is moved upward as a whole while the tail gate 31 remains in its horizontally extending (tilted-up) orientation. At the same time, the oil in the other chamber (above the piston as shown in FIG. 1) of the lift cylinder 1 is pushed out, passes through the port 17 and returns to the oil tank 18.

One of distinct characteristics of the control system according to this invention is that use is made of a pressure sensor. During a loading operation, the load on the tail gate adds pressure inside one of the oil chambers of the tilt cylinder if the tail gate rests on the ground as shown in FIG. 5. If the tail gate is stopped in the air above the ground, the load on the tail gate adds pressure inside both the tilt cylinder 2 and the lift cylinder 1. According to this invention, an overloaded condition of the tail gate is automatically detected by measuring the rise in the pressure inside the tilt cylinder and/or the lift cylinder.

Figure 3:
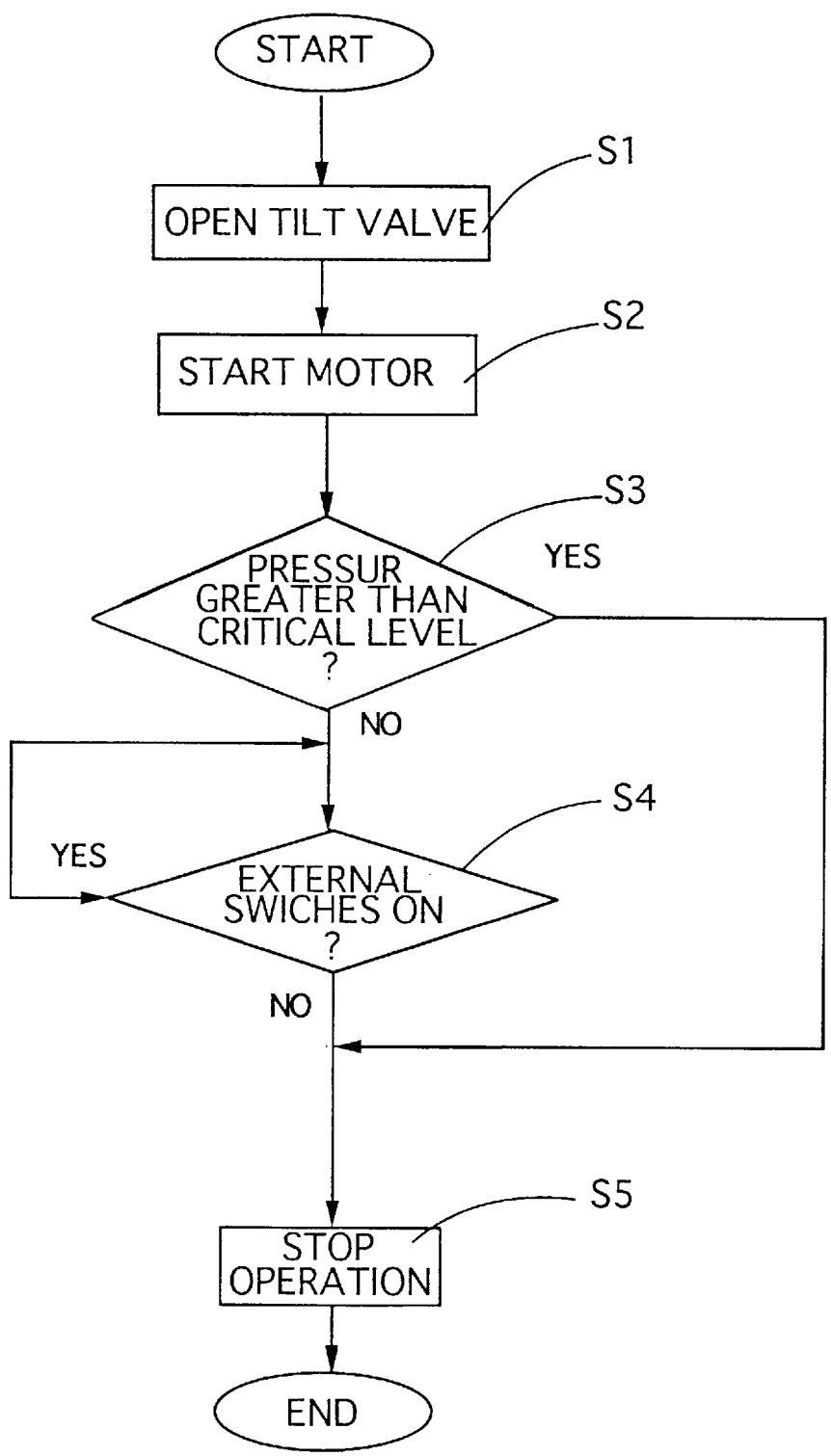
FIG. 3 is a flow chart of a method of controlling the tilt motion of such a lift according to this invention.
Figure 4B:
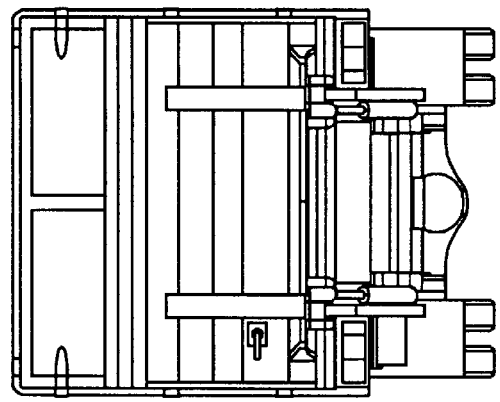
FIGS. 4A and 4B are side and back views of a truck with a freight lift.
Figure 4A:
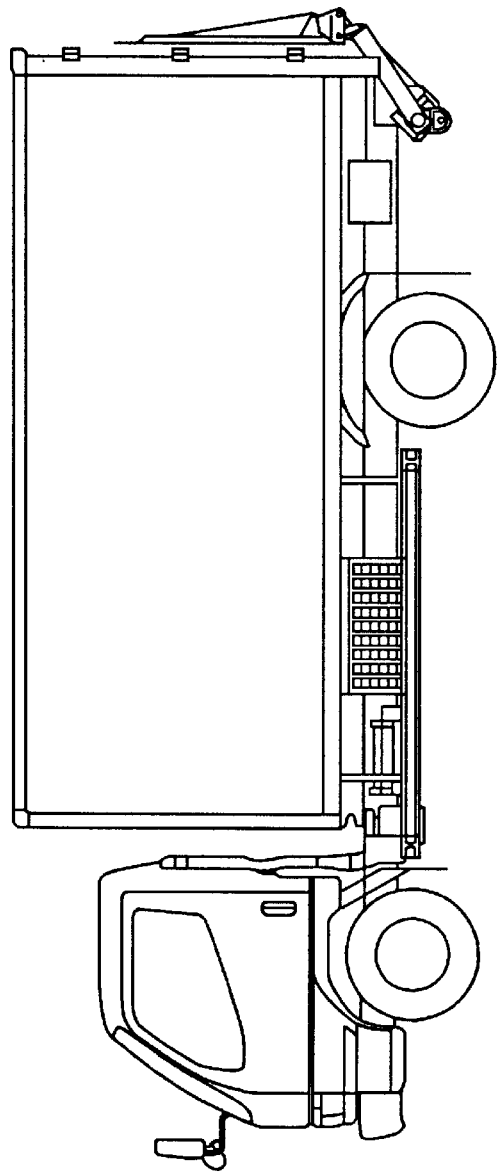

Next, a method of controlling the tilting motion by the control system described above will be explained with reference to the flow chart of FIG. 3. Let us assume again that the tail gate is initially in a horizontally oriented (tilted-up) position, whether it is in contact with the ground as shown by dotted lines in FIG. 5 or held in the air above the ground. If the external switches 10 and 11 are switched on and the tilt valve 8 and the main valve 4 are opened with the tail gate in this tilted-up orientation (Step S1), the tail gate rotates until it comes to the tilted-down position (shown by dotted lines in FIG. 5 if the tail gate is then in contact with the ground). After the tail gate has been loaded or unloaded, the motor 5 is switched on (Step S2). As the oil begins to flow into the tilt cylinder 2, the pressure therein is monitored and the measured pressure values are compared with the pre-determined critical value (Step S3). If the measured pressure inside the tilt cylinder 2 exceeds the critical value (YES in Step S3), it means that an overloaded condition exists, and the operation of the entire lift operating system is automatically stopped (Step S5). Even if there is no overloaded condition detected from the measurement of pressure inside the tilt cylinder 2 (NO in Step S3), the entire lift operating system is forcibly stopped (Step S5) if either of the external switches 10 and 11 is switched off (YES in Step S4). When the tail gate is stopped in the air above the ground, pressure values inside both the tilt cylinder 2 and the lift cylinder 1 may be compared with the critical value in Step S2.

One of distinct characteristics of the method according to this invention is that the pressure inside the tilt cylinder is compared with a pre-determined critical value. As the tail gate is tilted upward from the tilted-down orientation shown by dotted lines in FIG. 5 to the tilted-up orientation shown by solid lines in FIG. 5, the tail gate experiences a load force from the freight placed thereon but the moment of the load as measured in terms of the increased pressure inside the tilt cylinder is independent of the position of the freight on the tail gate. Thus, accurate measurements of the load are possible by the method of this invention described above. Another advantage of the method of this invention is that an overloaded condition can be detected while the tail gate is still resting on the ground or stopped in the air above the ground. It now goes without saying that this adds to the safety of loading and unloading operations.

What is claimed is:

1. A method of controlling a lift, said lift comprising a freight-receiving table rotatably supported by at least one hydraulic lift cylinder for moving said freight-receiving table up and down as a whole and at least one hydraulic tilt cylinder for tilting said freight-receiving table up and down, said method comprising the steps of:

tilting up said freight-receiving table after said freight-receiving table is loaded with freight;

measuring pressures inside both of said hydraulic cylinders and comparing said measured pressures with a pre-determined critical level;

stopping the overall operation of said lift automatically and immediately if either of said measured pressures exceeds said pre-determined critical level; and determining whether an overloaded condition exists through said measured pressures before said freight-receiving table is moved up or down as a whole.

2. The method of claim 1 wherein said steps of tilting up said freight-receiving table and measuring pressures are carried out independent of the initial position of said freight-receiving table when said freight-receiving table is loaded.

* * * * *